(12) United States Patent
Wei et al.

(10) Patent No.: US 10,814,279 B2
(45) Date of Patent: Oct. 27, 2020

(54) FORWARD OSMOSIS DRAW MATERIAL

(71) Applicant: BAOSHAN IRON & STEEL CO., LTD., Shanghai (CN)

(72) Inventors: Jing Wei, Victoria (AU); Ze-Xian Low, Combe Down Bath (GB); Huanting Wang, Victoria (AU); George Simon, Victoria (AU)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 41 days.

(21) Appl. No.: 15/759,670

(22) PCT Filed: Sep. 15, 2015

(86) PCT No.: PCT/CN2015/089577
§ 371 (c)(1),
(2) Date: Mar. 13, 2018

(87) PCT Pub. No.: WO2017/045114
PCT Pub. Date: Mar. 23, 2017

(65) Prior Publication Data
US 2019/0039021 A1    Feb. 7, 2019

(51) Int. Cl.
*B01D 61/00*    (2006.01)
*C02F 1/44*     (2006.01)
(Continued)

(52) U.S. Cl.
CPC ......... *B01D 61/005* (2013.01); *B01D 69/141* (2013.01); *C02F 1/445* (2013.01);
(Continued)

(58) Field of Classification Search
CPC ..... B01D 61/002; B01D 61/005; C02F 1/445; C08J 9/42; C08J 2205/022;
(Continued)

(56) References Cited

U.S. PATENT DOCUMENTS

| 6,271,278 B1 | 8/2001 | Park et al. | |
|---|---|---|---|
| 2002/0018884 A1* | 2/2002 | Thomson | B32B 5/18 |
| | | | 428/306.6 |

(Continued)

FOREIGN PATENT DOCUMENTS

| CN | 103706251 A | 4/2014 |
|---|---|---|
| WO | 2003089506 A1 | 10/2003 |
| WO | 2014175834 A | 10/2014 |

OTHER PUBLICATIONS

Liu, K., Ovaert, T.C., Mason, J.J., "Preparation and mechanical characterization of a PNIPA hydrogel composite", J. Mater Sci: Mater Med, 2008, 19, 1815-1821 (Year: 2008).*

(Continued)

*Primary Examiner* — James C Goloboy
(74) *Attorney, Agent, or Firm* — Thomas Horstemeyer, LLP

(57) ABSTRACT

A hydrogel composite draw material for forward osmosis comprising: a porous elastic polymeric foam element including a three-dimensional continuous network of pores interpenetrated with a polymer hydrogel. In use, the hydrogel composite draw material draws a water flux of at least 3.5 L/m²h.

25 Claims, 7 Drawing Sheets

(51) Int. Cl.
*B01D 69/14* (2006.01)
*C08J 9/42* (2006.01)
*C02F 103/08* (2006.01)

(52) U.S. Cl.
CPC .............. *C08J 9/42* (2013.01); *C02F 2103/08* (2013.01); *C08J 2205/022* (2013.01); *C08J 2205/042* (2013.01); *C08J 2205/05* (2013.01); *C08J 2207/00* (2013.01); *C08J 2333/26* (2013.01); *C08J 2400/14* (2013.01)

(58) Field of Classification Search
CPC .............. C08J 2205/042; C08J 2205/05; C08J 2207/00; C08J 2333/26; C08J 2400/14
See application file for complete search history.

(56) References Cited

U.S. PATENT DOCUMENTS

2011/0120941 A1  5/2011  Allen et al.
2014/0217026 A1  8/2014  Han et al.

OTHER PUBLICATIONS

Li, D., Zhang, X., Yao, J., Simon, G.P., Wang, H., "Stimuli-responsive polymer hydrogels as a new class of draw agent for forward osmosis desalination", Chem. Commun. 2011, 47, 1710-1712 (Year: 2011).*

De Moura, M. R., M. R. Guilherme, et al. (2005). "Porous alginate-Ca2+ hydrogels interpenetrated with PNIPAAm networks: Interrelationship between compressive stress and pore morphology." European Polymer Journal 41(12): 2845-2852.

Nistor, M.-T., A. P. Chiriac, et al. (2011). "Synthesis of hydrogels based on poly(NIPAM) inserted into collagen sponge." Colloids and Surfaces B—Biointerfaces 87(2): 382-390.

Liu, K., T. C. Ovaert, et al. (2008). "Preparation and mechanical characterization of a PNIPA hydrogel composite." Journal of Materials Science—Materials in Medicine 19(4): 1815-1821.

Teramoto et al (2014). "Polymer foam-reinforced hydrogels inspired by plant body frameworks as high-performance soft matter". Polymer Journal 46, 592-597.

Li, D., Zhang, X., Simon, G.P. and Wang, H. (2013) Forward osmosis desalination using polymer hydrogels as a draw agent: Influence of draw agent, feed solution and membrane on process performance. Water Research, 47 (1). pp. 209-215.

Zhao, S, Zou, L and, Mulcahy, D (2012) Brackish water desalination by a hybrid forward osmosis—nanofiltration system using divalent draw solute. Desalination 284: 175-18.

Cai et al. (2013) Towards temperature driven forward osmosis desalination using Semi-IPN hydrogels as reversible draw agents Water Research 47: 3773-378.

PCT/CN2015/089577 International Search Report and Written Opinion dated Jun. 21, 2016.

* cited by examiner

FORWARD OSMOSIS DRAW MATERIAL

CROSS-REFERENCE TO RELATED APPLICATIONS

This application is a 371 U.S. National Phase of PCT International Application No. PCT/CN2015/089577, filed on Sep. 15, 2015, which is incorporated by reference herein in their entirety.

TECHNICAL FIELD

The present invention generally relates to a novel hydrogel composite draw material for forward osmosis. The present invention provides a class of new interpenetrating materials utilised as draw agents for forward osmosis desalination and purification processes.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Water desalination and purification are critical to meet the global issue of the shortage of clean water (see references 1 and 2). Forward osmosis (FO) has been recognized as an attractive process for water desalination and treatment in recent years because it has the potential to achieve reduced process costs by directly using other types of energy such as low-grade heat, reduced fouling propensity, and easy cleaning (see references 3 to 8).

Forward osmosis (FO) is the membrane separation process in which the osmotic pressure difference serves as the driving force for water transport, with a semi-permeable membrane acting as a separation medium. In a typical FO separation, the feed solution, i.e. saline water, passes through the one side of a semipermeable membrane, and a draw agent of high osmotic pressure (compared to that of saline water) flows on the other side of membrane. Due to the naturally driven osmotic flow, water permeates through the membrane from the feed solution to the draw agent side. After FO process, it is necessary to separate the water and draw agent for the recovery of pure water product and regeneration of draw agent for reuse in the FO process.

Although FO technology has attracted increasing attention in water treatment, one of the main obstacles is the lack of high-performance draw solute (see references 9 to 11). It is very challenging to develop an ideal draw agent with a high osmotic pressure, easy and fast regeneration without significant loss of draw agent, and non-toxicity. A lot of work have focused on the new draw agents such as inorganic salts, functionalized magnetic nanoparticles, and thermo-responsive polyelectrolyte solutions (see references 4 and 12 to 24).

Recently, a stimuli-responsive polymer hydrogel was developed as draw agent in FO desalination (see references 11 and 25 to 33). Hydrogels are widely used as scaffolds for tissue engineering, temporary supports for cell and vehicles for drug delivery systems as the three-dimensional networks of polymer chains and abundant hydrophilic groups can entrap large volumes of water due to their relative higher osmosis pressure. However, the forms of hydrogel previous considered as draw agents (powder having a particle size ranging from 2 to 1000 μm) exhibited low flux, and low yield for clean water (see references 11 and 25 to 33). When using a powder, as the hydrogel particle size decreases, the contact area between hydrogel and FO membrane increases remarkably, resulting in an enhanced FO flux (see reference 34). At the same time, increasing the amount of draw agent will give an enhanced flux. However, as the amount further increases, the flux remains constant. This is because the water transport becomes difficult from the first layer hydrogel particles contacted with FO membrane to the subsequent layers. Due to this transport barrier, the hydrogel powder shows much lower flux comparing to the common used draw agent such as inorganic salts. Thus, if hydrogels are to be used as a draw agent, this transport barrier problem will need to be solved to further increase the flux.

Accordingly, it would therefore be desirable to new or alternative interpenetrating materials, in particular a hydrogel based material, which could be used as effective draw agents for forward osmosis process.

SUMMARY OF THE INVENTION

The present invention provides a new hydrogel composite draw material for forward osmosis and a method of producing this new composite material.

A first aspect of the present invention provides a hydrogel composite draw material for forward osmosis comprising:

a porous elastic polymeric foam element including a three-dimensional continuous network of pores interpenetrated with a polymer hydrogel, wherein, in use, the hydrogel composite draw material draws a water flux of at least 3.5 L/m$^2$h.

It should be appreciated that the hydrogel composite draw material of the present invention is preferably a draw material in forward osmosis desalination.

The porous elastic polymeric foam/hydrogel composites of the present invention have been developed to provide a high draw flux in use as a draw material on the active side of a FO membrane in forward osmosis in particular, forward osmosis (FO) desalination. The porous elastic polymeric foam provides a synergistic support structure for the hydrogel whist retaining the advantageous aqueous draw and swelling properties of the hydrogel. Moreover, this composite structure provides a substantial improvement over the use of hydrogel alone. By comparison, the maximum flux is typically only 2.2 LMH when hydrogel powders alone are were used as the draw agent. This result is comparable to that obtained using 1.5 M NH$_4$HCO$_3$, which is the current standard methodology.

Whilst not wishing to be limited to any one theory, the inventors consider that the three-dimensional continuous network of pores throughout the foam provides an elastic nature to the foam and possible capillary forces that can extend along the interface between the foam and hydrogel may assist adsorption/desorption of water. These factors are also of benefit to the water transport from the contact layer of hydrogel to the upper layer, which facilitates water transport in this draw material. The use of the composite therefore appears to avoid the water transport barrier which is present when the hydrogel is used in a powder form in a similar forward osmosis draw material application.

The Inventors note that the suitability of a hydrogel/polymer foam composite for a draw agent in forward osmosis desalination has not previously been known. However, the inventors are aware that hydrogel/polyurethane foam (PUF) composites have been developed for other applications, and in particular to address poor mechanical properties of hydrogels with the aim to improve hydrogels practical use in mainly biomechanical and medical applications.

Firstly, Liu et al in Preparation and mechanical characterization of a PNIPA hydrogel composite, *J Mater Sci: Mater Med* (2008) 19:1815-1821 discusses the advantageous mechanical properties of poly (N-isopropylacrylamide) (PNIPA) hydrogel/polyurethane foam composites with particular emphasis on swelling and volume phase transition properties useful in biomedical and bioengineering applications such as tissue engineering, switches, micro/nonoactuators, artificial organs, and drug delivery. Liu's aim is to provide strong, stiff hydrogels with the same composition as PNIPA for biomechanical applications. To this end, a poly (N-isopropylacrylamide) (PNIPA) hydrogel was synthesized by immersing a polyurethane foam in a monomer solution (N-isopropylacrylamide dissolved in 1,4-dioxane) in the presence of an initiator (2,2'-azobisisobutyronitrile) and a crosslinker (ethylene glycol dimethacrylate) to initiate free radical polymerization to make a hydrogel composite. After gelation, the mechanical properties of the composite gel were studied, including the temperature dependence of the elastic modulus of the PNIPA hydrogel and the composite due to volume phase transition was found using a uniaxial compression test, and the swelling property was investigated using an equilibrium swelling ratio experiment. The gel composite preserves the ability to undergo the volume phase transition and its elastic modulus had strong temperature dependence. The temperature dependence of the elastic modulus and swelling ratio of the gel composite were compared to the PNIPA hydrogel. The modulus and swelling ratio of the composite were less dramatic than in the gel. In particular, its swelling ability was significantly lower than the pure PNIPA gel in the swollen state (see FIG. 3 of Liu). In the collapsed state, the gel composite contains more weight percent of water, since the swelling ability of the open-cell foam is lower than the PNIPA gel in the swollen state and higher in the collapsed state. Thus, for temperatures above the LCST, the foam retains the water in the gel composite, and at low temperature the foam prevents water from entering.

Secondly, Teramoto et al. in Polymer foam-reinforced hydrogels inspired by plant body frameworks as high-performance soft matter, *Polymer Journal* (2014) 46, 592-597 follows on from Lui et al's research (which is directly referenced as being the starting basis) and investigates the mechanical properties of poly(sodium acrylate) (PSA) hydrogel/polyurethane foam composite with particular emphasis on the strength of the composite gel. Again, the aim of the research is to provide strong, stiff hydrogels for biomechanical or medical applications. In this study, a hydrogel reinforced by polymer foam was fabricated by immersing a polyurethane foam in an aqueous solution of a water-soluble monomer (sodium acrylate) in the presence of an initiator (2,2'-azobis(2-methylpropionamidine) dihydrochloride) and a crosslinker (N,N'-methylenebisacrylamide). After gelation, only the mechanical properties of the composite gel were analysed by compression testing. The compression strength of the composite gel was ~2 MPa, which was much higher than that of the poly(sodium acrylate) (PSA) hydrogel alone. The compression modulus was also considerably higher than for each constituent material alone (both hydrogel and foam). Importantly, only the mechanical properties are reported. No swelling and water transport properties were not reported or taught as being important to the function or suitability of the studied composite to the medical and biomechanical applications for which the composite is suitable.

Each of these previous hydrogel composite studies only concentrated on the mechanical support and reinforcing properties that polymer foam had on the hydrogels and their composites applicable for medical or biomechanical applications. No consideration was given to the water transport or draw agent properties of the produced composites, and more importantly properties suitable for use in forward osmosis and more particularly as an effective draw agent in forward osmosis. In fact, based on Lui et al, the modulus and swelling ratio of the composite of each of these prior composites were significantly less than the hydrogel. The swelling and water transport properties of these reported hydrogel composites appear to teach that such composites do not have suitable properties for effective water transport and high flux when used as draw agent.

In this context and despite the unfavourable swelling results reported in the previous work, the Inventors have surprisingly found that the hydrogel composites of the present invention show effective water transport and high flux when used as draw agent for forward osmosis desalination.

Furthermore, previously considered hydrogel draw agents were in a powder form which showed weak mechanical toughness, especially after swelling. In comparison, the interpenetrating monolith of the present invention is easy to be use, mechanically robust and readily able to be recycled in practical applications.

Again, the hydrogel composite draw material of the present invention provides a high draw flux in use as a draw material in forward osmosis in particular, forward osmosis desalination. The draw flux is at least 3.5 L/m$^2$h. It should be appreciated that for measurement and comparison purposes this water flux is preferably measured when 2000 ppm aqueous NaCl solution is used as feed.

In some embodiments, in use, the hydrogel composite draw material draws a water flux of at least 3.9 L/m$^2$h, preferably at least 4 L/m$^2$h, more preferably at least 5 L/m$^2$h. In embodiments, the hydrogel composite draw material can draw a water flux of at least 6 L/m$^2$h, preferably at least 10 L/m$^2$h, more preferably at least 12 L/m$^2$h. In some embodiments, the hydrogel composite draw material draws a water flux of from 3 to 20 L/m$^2$h, preferably from 4 to 18 L/m$^2$h. In exemplary embodiments the hydrogel composite draw material draws a water flux of between 3.9 and 17.9 L/m$^2$h.

The content of the hydrogel within the foam element influences the water draw flux of the final hydrogel composite draw material. The content of hydrogel in the composite is preferably from 50 to 95 wt %. However, in embodiments the hydrogel content can be from 60 to 90 wt %, preferably between 70 to 90 wt %. In some embodiments, the content of hydrogel in the composite is from 50 to 89 wt %, which, in use, produces a hydrogel composite draw material draws a water flux from 3.9 to 17.9 L/m$^2$h.

It should also be appreciated that the draw water flux also varies based on the composition of the hydrogel composite draw material.

The polymer hydrogel responsible for its water-swelling properties can have any suitable composition. It should be understood that a hydrogel is a water-swollen, and cross-linked polymeric network that exhibits the ability to swell and retain a significant amount of water within its structure, but will not dissolve in water. They possess the capacity to entrap a large volume of water caused by the flexibility and hydrophilicity of polymeric networks. A hydrogel therefore consists of a large amount of water and a small amount of hydrophilic 3D polymers that form a network. A hydrogel can typically swell and retain from 50 wt % up to 99 wt % water, more preferably 85 wt % up to 98 wt % water within its structure.

Polymer hydrogels can undergo a reversible swelling change in response to external environmental stimuli, such as pH, temperature, electric field, mechanical stress, antibodies and the like. Therefore, the composite of the present invention can drive water to pass through the semipermeable membrane and the water can subsequently be released from swollen hydrogels by using temperature, pressure or solar irradiation (or a combination of these) as external stimuli. In some embodiments, the hydrogel comprises a stimuli-responsive polymer hydrogel. Stimuli-responsive polymer hydrogels can undergo a reversible swelling change in response to external environmental stimuli. This intrinsic property can be applied for the dewatering of hydrogel after FO desalination, which exhibits an energy efficient method to regenerate the draw agent. Stimuli-responsive polymer hydrogel therefore reduce energy consumption in water recovery from the hydrogel. Particular examples are poly(N-isopropylacrylamide) (PNIPAM)-based hydrogels. It should be appreciated that poly(N-isopropylacrylamide) (PNIPAM)-based hydrogels comprise polymers and copolymers containing N-isopropylacrylamide. Examples include Poly(N-isopropylacrylamide), Poly(N-isopropylacrylamide)-co-poly(sodium acrylate), Poly(N-isopropylacrylamide)-co-poly(acrylic acid), Poly(N-isopropylacrylamide)-co-poly(acrylamide); Poly(N-isopropylacrylamide)-co-poly(vinyl alcohol); Poly(N-isopropylacrylamide)-co-poly(alginic acid). For example, poly(N-isopropylacrylamide) (PNIPAM)-based hydrogels show a low critical solution temperature (LCST) at about 32° C., which can change from hydrophilic to hydrophobic above their LCST and release the entrapped water from their network.

The polymer hydrogel also preferably includes an ionic polymer hydrogel content, for example polymers or co-polymers of sodium acrylate. The presence and dissociation of ionic species within polymer hydrogels induces the hydrogels to swell and develop a higher internal osmotic pressure.

In embodiments, the hydrogel comprises a polymer or a co-polymer of one or more of: (meth)acrylic acid, salts of (meth)acrylic acid, esters of (meth)acrylic acid and hydroxyl derivatives thereof, itaconic acid, salts and acids of esters of (meth)acrylic acid, amides of (meth)acrylic acid, N-alkyl amides of (meth)acrylic acid, salts and acids of N-alkyl amides of (meth)acrylic acid, N-vinyl pyrrolidone, (meth)acrylamide, N-alkyl derivatives of (meth)acrylamide, alkyl ammonium salts, N-alkyl derivatives of an alkyl (meth)acrylate, 2-acrylamido-2-methyl-1-propanesulfonic acid, potassium salt of 3-sulfopropyl acrylate, 2-(acryloyloxy) ethyl trimethyl ammonium methyl sulfate, acrylamide (AAm), N-isopropyl acrylamide (NIP AM), 2-hydroxyethyl (meth)acrylate (HEA, HEMA), acrylic acid (AAc), salts of acrylic acid (potassium, sodium and ammonium), potassium salt of 3-sulfopropyl acrylate (SPAK), poly(ethylene glycol) acrylate, poly(ethylene glycol)alkyl ether acrylate, methacrylic acid-2-dimethylaminoethyl ester, dimethylaminoethyl acrylate or diallyl dimethylammonium chloride (DADMAC).

Based on the above, certain embodiments of the polymer hydrogel may therefore comprises at least one of poly(N-isopropylacrylamide), poly(sodium acrylate), poly(vinylsulfonic acid, sodium salt), polyvinyl alcohol, Poly(N-isopropylacrylamide)-co-poly(sodium acrylate) or a combination thereof.

In some embodiments, the polymer hydrogel comprises at least one ethylenically-unsaturated monomer polymerised with at least one multi-olefinic crosslinking agent.

A number of ethylenically-unsaturated monomer can be used to form the polymer hydrogel. Suitable monomers include at least one ethylenically-unsaturated monomer is selected from (meth)acrylic acid, salts of (meth)acrylic acid, esters of (meth)acrylic acid and hydroxyl derivatives thereof, itaconic acid, salts and acids of esters of (meth)acrylic acid, amides of (meth)acrylic acid, N-alkyl amides of (meth)acrylic acid, salts and acids of N-alkyl amides of (meth)acrylic acid, N-vinyl pyrrolidone, (meth)acrylamide, N-alkyl derivatives of (meth)acrylamide, alkyl ammonium salts, N-alkyl derivatives of an alkyl (meth)acrylate, 2-acrylamido-2-methyl-1-propanesulfonic acid, potassium salt of 3-sulfopropyl acrylate, and 2-(acryloyloxy)ethyl trimethyl ammonium methyl sulfate. Furthermore, in some embodiments, the ethylenically-unsaturated monomer is selected from at least one of acrylamide (AAm), N-isopropyl acrylamide (NIP AM), 2-hydroxyethyl (meth)acrylate (HEA, HEMA), acrylic acid (AAc), salts of acrylic acid (potassium, sodium and ammonium), potassium salt of 3-sulfopropyl acrylate (SPAK), poly(ethylene glycol)acrylate, poly(ethylene glycol)alkyl ether acrylate, methacrylic acid-2-dimethylaminoethyl ester, dimethylaminoethyl acrylate and diallyldimethylammonium chloride (DADMAC).

In exemplary embodiments, the ethylenically-unsaturated monomer is selected from N-isopropylacrylamide, sodium acrylate or a combination thereof.

Similarly, a number of crosslinking agent can be used to form the polymer hydrogel. For example, in embodiments the crosslinking agent can be selected from the group consisting of N,N'-methylenebisacrylamide (BIS), N,N'-ethylenebisacrylamide (EBA), (poly)ethylene glycol di(meth)acrylate, ethylene glycol dimethacrylate, ethylene glycol diglycidyl ether, glycidyl methacrylate, polyamidoamine epichlorohydrin resin, trimethylolpropane triacrylate (TMPTA), piperazine diacrylamide, glutaraldehyde, epichlorohydrin, crosslinkers containing 1,2-diol structures, and functionalized peptides and proteins.

In exemplary embodiments, the crosslinking comprises N,N'-methylenebisacrylamide.

It should also be understood that the porous elastic polymeric foam element comprises a suitable configured article, item, piece, portion, item, part, body or the like of the porous elastic polymeric foam material. It should further be appreciated that a foam element comprises at least one foam body, article or the like which includes a three-dimensional continuous network of pores. One exemplary form of the foam element comprises a polymeric elastic sponge.

The porous elastic polymeric preferably has a three-dimensional open pore structure. In embodiments, the open pore structure forms a three-dimensional continuous network of pores substantially throughout the foam. Again, the Inventors consider that the three dimensional continuous network, provides an elastic nature when adsorption/desorption of water which is of benefit to the water transport from the contact layer of hydrogel to upper layer. This appears to avoid a water transport barrier which is present when the hydrogel is used in a powder form in a similar forward osmosis draw material application.

The pore of the three dimensional pore structure of the foam pores of the foam can have any suitable size. In some embodiments, the pores are sized from 200 nm to 1 mm. In some embodiments, the average pore size is at least 400 nm, preferably about 400 nm. The hydrogel is preferably formed in at least the macropores (>400 nm) of the porous elastic foam material.

Any suitable elastic polymeric foam material can be used. For example, in embodiments the porous elastic polymeric foam element may comprises a polyurethane foam, polyester foam, melamine foam, graphene oxide foam, or poly (ether imide) foam. In preferred forms, the porous elastic polymeric foam element comprises a polyurethane sponge. However, it should be appreciated that foams of other rubbery materials, particularly hydrophilic foams could be used, including foams based on a range of rubbery, polar polymers, which are not water-soluble. Accordingly, in some embodiments, the porous elastic polymeric foam element comprises a Poly(N-isopropylacrylamide)-co-poly(sodium acrylate) in polyurethane foam composite.

The hydrogel composite draw material can have any desired form or configuration to fit the particular draw application and forward osmosis equipment. In preferred embodiments, the hydrogel composite draw material has a monolith form. An interpenetrating monolith is easy to be use, mechanically robust and readily able to be recycled in practical applications. Advantageously, the monolith form may be shaped by tailoring the configuration of the base polymer foam element.

In particular embodiments, the present invention provides a hydrogel composite draw material for forward osmosis comprising:
a porous elastic in polyurethane foam element including a three-dimensional continuous network of pores interpenetrated with a polymer hydrogel comprising Poly(N-isopropylacrylamide)-co-poly(sodium acrylate),
wherein, in use, the hydrogel composite draw material draws a water flux of at least 3.5 L/m$^2$h.

A second aspect of the present invention also provides a method of forming a forward osmosis draw material. This method comprises the steps of:
(i) introducing at least one ethylenically-unsaturated monomer and a multi-olefinic crosslinking agent within at least a portion of the pores of a porous elastic polymeric foam element including a three-dimensional continuous network of pores; and
(ii) subjecting the admixture to polymerization conditions to form a hydrogel composite thereof within the pores of the foam element, thereby forming a hydrogel composite draw material for forward osmosis which in use, draws a water flux of at least 3.5 L/m$^2$h.

Again, the hydrogel composite draw material of the present invention preferably provides a high draw flux in use as a draw material in forward osmosis in particular, forward osmosis desalination. In use, the hydrogel composite draw material draws a water flux of at least 3.5 L/m$^2$h. It should be appreciated that for measurement and comparison purposes this water flux is preferably measured when 2000 ppm aqueous NaCl solution is used as feed.

The method can include the further step of removal of unreacted monomer and water using a wash and dry process.

It should be appreciated that all of the above features discussed in relation to the first aspect of the present invention can be equally applied and used in this second aspect of the present invention.

The at least one ethylenically-unsaturated monomer and the multi-olefinic crosslinking agent can be introduced within the pores of the porous elastic polymeric foam element in any suitable method. In some embodiments, the at least one ethylenically-unsaturated monomer and a multi-olefinic crosslinking agent are combined to form an admixture thereof, that admixture is then introduced into the pores of the porous elastic polymeric foam. Furthermore, said introducing step preferably comprises interpenetrating the at least one ethylenically-unsaturated monomer and the multi-olefinic crosslinking agent within the pores of the porous elastic polymeric foam. In embodiments, the at least one ethylenically-unsaturated monomer and the multi-olefinic crosslinking agent are introduced within the pores of the porous elastic polymeric foam element by fully soaking the porous elastic polymeric foam element in a solution, preferably admixture, of the monomer(s), cross-linker and where applicable initiator.

The hydrogel-sponge interpenetrating network can be easily shaped depending on applications. In embodiments, the method therefore further includes the step of: tailoring the shape of the polymer foam element to provide a selected configuration prior to introduction of the admixture to the polymer foam. By tailoring the shape of the polymer foam element, the hydrogel composite draw material can be easily shaped. The swelled PUF/hydrogel can be handling easily during the applications and tailored by scissor without destroying their monolith-like shape. Moreover, the shape can be tuned by tailoring the sponge structure.

The concentration of monomers can influence the final hydrogel content of the composite. In some embodiments, the concentration of monomers is from 12.6 to 20 wt % in solution.

Again, the content of the hydrogel within the foam element influences the water draw flux of the final hydrogel composite draw material. The content of hydrogel in the composite is preferably from 50 to 90 wt %. However, in embodiments the hydrogel content can be from 60 to 90 wt %, preferably between 70 to 90 wt %. In some embodiments, the content of hydrogel in the composite is from 50 to 89 wt %, which, in use, produces a hydrogel composite draw material draws a water flux from 3.9 to 17.9 L/m$^2$h.

As discussed in relation to the first aspect, a number of ethylenically-unsaturated monomer can be used to form the polymer hydrogel in the method of this second aspect. Suitable monomers include at least one ethylenically-unsaturated monomer is selected from (meth)acrylic acid, salts of (meth)acrylic acid, esters of (meth)acrylic acid and hydroxyl derivatives thereof, itaconic acid, salts and acids of esters of (meth)acrylic acid, amides of (meth)acrylic acid, N-alkyl amides of (meth)acrylic acid, salts and acids of N-alkyl amides of (meth)acrylic acid, N-vinyl pyrrolidone, (meth)acrylamide, N-alkyl derivatives of (meth)acrylamide, alkyl ammonium salts, N-alkyl derivatives of an alkyl (meth)acrylate, 2-acrylamido-2-methyl-1-propanesulfonic acid, potassium salt of 3-sulfopropyl acrylate, and 2-(acryloyloxy)ethyl trimethyl ammonium methyl sulfate. Furthermore, in some embodiments, the ethylenically-unsaturated monomer is selected from at least one of acrylamide (AAm), N-isopropyl acrylamide (NIPAM), 2-hydroxyethyl (meth) acrylate (HEA, HEMA), acrylic acid (AAc), salts of acrylic acid (potassium, sodium and ammonium), potassium salt of 3-sulfopropyl acrylate (SPAK), poly(ethylene glycol)acrylate, poly(ethylene glycol)alkyl ether acrylate, methacrylic acid-2-dimethylaminoethyl ester, dimethylaminoethyl acrylate and diallyldimethylammonium chloride (DADMAC).

In exemplary embodiments, the ethylenically-unsaturated monomer is selected from N-isopropylacrylamide, sodium acrylate or a combination thereof.

Similarly, a number of crosslinking agent can be used to form the polymer hydrogel in the method of this second aspect. For example, in embodiments the crosslinking agent can be selected from the group consisting of N,N'-methylenebisacrylamide (BIS), N,N'-ethylenebisacrylamide (EBA), (poly)ethylene glycol di(meth)acrylate, ethylene glycol dimethacrylate, ethylene glycol diglycidyl ether, glycidyl methacrylate, polyamidoamine epichlorohydrin resin, trimethylolpropane triacrylate (TMPTA), piperazine diacrylamide, glutaraldehyde, epichlorohydrin, crosslinkers containing 1,2-diol structures, and functionalized peptides and proteins.

In exemplary embodiments, the crosslinking comprises N,N'-methylenebisacrylamide.

The polymerisation step can be conducted using any known polymerisation technique. In some embodiments, polymerization comprises radical polymerization of the monomers. Polymerisation is preferably controlled in macropores (~400 μm) of the porous elastic polymeric foam element.

Polymerization can be initiated by any known applicable mechanism, including photochemical (e.g. using a UV lamp), thermal (e.g. using ammonium persulfate (APS)) and oxidation-reduction reactions (e.g. using APS/sodium metabisulfite (SMBS) or APS/tetramethylethylene diamine (TMEDA). In preferred embodiments further including the step of:

adding an initiator to initiate polymerisation of the hydrogel, wherein the initiator is selected from the group consisting of 2,2'-azobisisobutyronitrile, 2,2'-azobis(2-methylpropionamidine) dihydrochloride and ammonium persulfate. In exemplary embodiments, the initiator comprises ammonium persulfate.

A fourth aspect of the present invention provides a hydrogel composite draw material according to the first aspect of the present invention formed from the method according to the second aspect of the present invention.

A fifth aspect of the present invention provides use of a hydrogel composite comprising a porous elastic polymeric foam element including a three-dimensional continuous network of pores interpenetrated with a polymer hydrogel for a draw material in forward osmosis, wherein, in use, the hydrogel composite draw material draws a water flux of at least 3.5 L/m²h.

Again, the hydrogel composite draw material of the present invention preferably provides a high draw flux in use as a draw material in forward osmosis in particular, forward osmosis desalination. Again, It should be appreciated that for measurement and comparison purposes this water flux is preferably measured when 2000 ppm aqueous NaCl solution is used as feed.

The hydrogel composite preferably comprises a hydrogel composite draw material for forward osmosis according to the first aspect of the present invention. In this respect, it should be appreciated the all of the above features discussed in relation to the first aspect and second of the present invention can be equally applied and used in this fifth aspect of the present invention.

A sixth aspect of the present invention provides a method of use of a hydrogel composite draw material according to the first aspect of the present invention in a forward osmosis desalination process including a semipermeable membrane including a feed side and an active side. The method comprises:

locating a hydrogel composite draw material according to the first aspect of the present invention on the active side 110 a semipermeable membrane of a forward osmosis apparatus;

flowing a feed saline solution flows across the opposite side of the semipermeable membrane, thereby allowing pure water to pass through the membrane and be absorbed by the hydrogel composite draw material.

It should be appreciated the all of the above features discussed in relation to the first aspect and second of the present invention can be equally applied and used in this sixth aspect of the present invention.

After the FO process, and once the polymer hydrogels in the composite are substantially swollen by absorbed water, the method preferably further includes the step of:

dewatering the hydrogel composite draw material using an appropriate stimuli selected from the application of at least one of: light, heat or pressure to substantially remove the absorbed water content from the hydrogel composite draw material.

Following the dewatering step, the (dewatered) hydrogel composite draw material can be recycled for use in a further forward osmosis process.

Finally, in some aspects, the present invention provides a hydrogel composite draw material for forward osmosis comprising:

a porous elastic polymeric foam element including a three-dimensional continuous network of pores interpenetrated with a polymer hydrogel.

wherein, in use, the hydrogel composite draw material draws a water flux of at least 3 L/m²h, preferably at least 3.5 L/m²h measured when 2000 ppm aqueous NaCl solution is used as feed.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

The present invention provides a hydrogel-polymer foam interpenetrating network (HPIPN) with monolith form formulated to function as an effective draw agent for a forward osmosis desalination process and a process of producing this composite material.

In broadest terms, the hydrogel composite draw material of the present invention comprises a porous elastic polymeric foam element including a three-dimensional continuous network of pores interpenetrated with a polymer hydrogel. The hydrogel composite draw material is formulated or composed to draws a water flux of at least 3.5 L/m$^2$h. It should be appreciated that for measurement and comparison purposes this water flux is preferably measured when 2000 ppm aqueous NaCl solution is used as feed.

The hydrogel preferably comprises a stimuli-responsive polymer hydrogel. For example, poly(Nisopropylacrylamide) (PNIPAM)-based hydrogels show a low critical solution temperature (LCST) at about 32° C., which can change from hydrophilic to hydrophobic above their LCST and release the entrapped water from their network. This intrinsic property can be applied for the dewatering of hydrogel after FO desalination, which exhibits an energy efficient method to regenerate the draw agent.

Figure 1A:
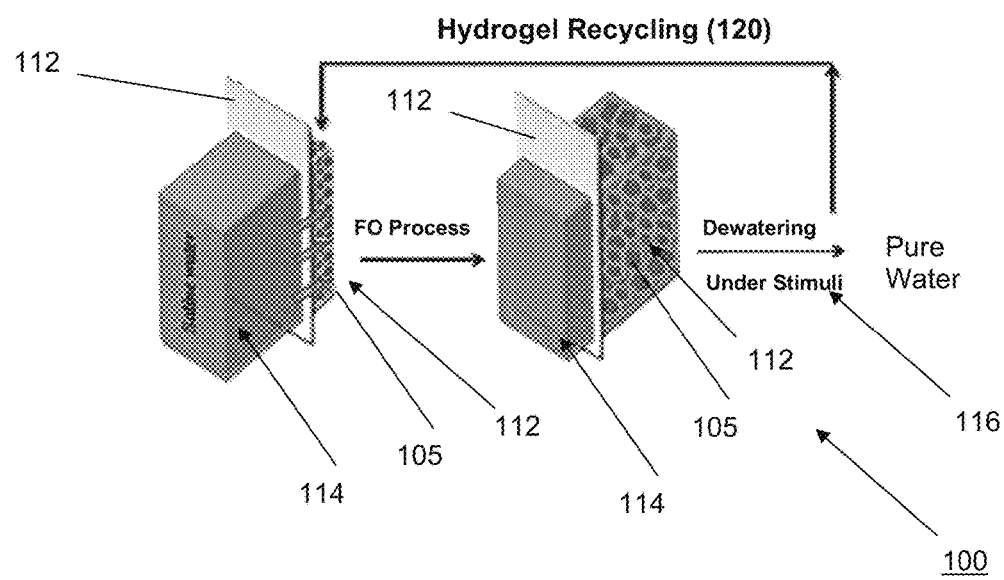
FIG. 1A provides a schematic of the synthesis of gel/PUF composites according to the present invention.

The hydrogel-foam composite of the present invention is used as a draw material for forward osmosis (FO) desalination. FIG. 1A shows a schematic representation of FO desalination 100 by using hydrogel-foam composite 105 as draw agents. In principle, there are two primary steps which comprise this desalination process, the FO step and the dewatering step. Hydrogel-foam composite 105 are used as the draw agents. They are placed on the active side 110 (rejection layer) of the semipermeable membrane 112 as a deswollen hydrogel/foam composite. A feed saline solution flows across the other side 114 of the semipermeable membrane 112. Owing to a high swelling pressure, polymer hydrogels enable pure water to pass through the membrane and become swollen via absorption of the water; and the hydrated ions at the feed side are rejected by the membrane 112. After the FO process swollen polymer hydrogels in the composite 105 are dewatered under different stimuli 116, such as light, heat and pressure to recover the water. The composite 105 is then recycled 120 for further FO.

Figure 1B:
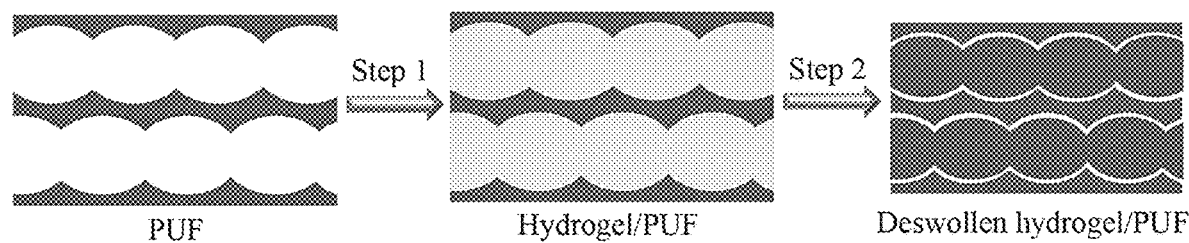
FIG. 1B shows a schematic representation of forwards osmosis (FO) desalination by using hydrogel-foam composite of the present invention as draw agents.

Such a hydrogel composite draw material can be prepared by controlling the polymerization of the monomers (for example N-isopropylacrylamide and sodium acrylate) in the pores of the porous elastic polymeric foam element. As shown in FIG. 1B, the process of preparing a hydrogel composite draw material of the present invention typically involves the steps of:

Step 1: polymerization of hydrogel monomer in a matrix of polymer foam to obtain the hydrogel/foam composites of the present invention. This step can comprise:
(i) introducing at least one ethylenically-unsaturated monomer and a multi-olefinic crosslinking agent within at least a portion of the pores of a porous elastic polymeric foam element including a three-dimensional continuous network of pores; and
(ii) subjecting the admixture to polymerization conditions to form a hydrogel composite thereof within the pores of the foam element.

Step 2: removal of unreacted monomer and water using a wash and dry process. For example, the unreacted monomers and low-molecular-weight polymer can be removed from the composite through washing and/or immersion in a EtOH and water mixture (v/v, 1:1) to remove the unreacted monomers and low-molecular-weight polymer and then heated and dried at for example at 80° C. in an oven.

In the first step, the monomer and crosslinking agent are typically combined to form an admixture thereof, that admixture is then introduced to interpenetrate into the pores of the porous elastic polymeric foam, for instance by soaking the foam element in the admixture.

Whilst not wishing to be limited to any one theory, the Inventors have surprisingly found that a polymer foam can be used as a 3D continuous skeleton to fabricate a hydrogel monolith and still retain effective water transport and high flux when used as draw agent for FO desalination. The porous elastic polymeric foam provides a synergistic support structure for the hydrogel whist retaining the advantageous aqueous draw and swelling properties of the hydrogel. The porous elastic polymeric foam/hydrogel composites of the present invention have been developed to provide a high draw flux in use as a draw material in forward osmosis in particular, forward osmosis desalination.

The Inventors note that the structure of hydrogel/polyurethane foam composites has been studied in prior research in the context of providing a reinforcing support or framework for a hydrogel to improve the mechanical properties of a hydrogel for practical applications as discussed in the background to this invention (i.e. Lui et al (2008) and Teramoto et al. (2014)). However, the Inventors note that the application of hydrogel/PUF for the draw agent in FO desalination is novel and surprising, particularly given the results of previous studies of similar material.

Each of these previous hydrogel composite studies concentrated on the mechanical support and reinforcing properties that polymer foam had on the hydrogels and their composites applicable for medical or biomechanical applications. Compositions and mechanical properties were optimised on that basis. No consideration was given to the water transport or draw agent properties of the produced composites, and more importantly properties suitable for use in forward osmosis and more particularly as an effective draw agent in forward osmosis. In fact, based in Lui et al (2008), the modulus and swelling ratio of the composite of each of these prior composites were significantly less than the hydrogel. The swelling and water transport properties of these reported hydrogel composites appear to teach that such composites do not have suitable properties for effective water transport and high flux when used as draw agent.

In this context and despite the unfavourable swelling results reported in the previous work, the Inventors have surprisingly found that the hydrogel composites of the present invention show effective water transport and high flux when used as draw agent for forward osmosis desalination.

The inventors also note that three-dimensional polymer structures have also been formed within hydrogels to strengthen the hydrogel structure. For example, International patent publication No. WO 2003089506 A1 entitled Hydrogels having enhanced elasticity and mechanical strength properties teaches hydrogel hybrid formulations containing a strengthening agent (such as natural or synthetic polymers, polyelectrolytes, or neutral, hydrophilic polymers) to chemical or physical crosslinking conditions subsequent to initial gel formation. The hydrogels are developed to enhance their mechanical strength particularly when swollen in water. The hydrogels are taught with particular emphasis on industrial applications in agriculture, horticulture, hygiene, construction, medical and biomedical fields where they can be used as a particulate to impart a well-defined shape to water-absorbent polymers. Examples include pharmaceutical compositions, gastric retention devices, long-term water holding in horticulture and hygienic products, water sealing, or caulking in civil constructions, and the like.

The enhanced hydrogels are formed using a base hydrogel polymer formed of at least one ethylenically-unsaturated monomer and a multi-olefinic crosslinking agent in the presence of a strengthening agent comprising a crosslinkable natural or synthetic polymer. The strengthening agent thereby occupies the interstices of the base hydrogel polymer matrix. Upon conversion of the strengthening agent to its crosslinked structural form, e.g., by ionic gellation, the resulting product acquires a greater compression modulus than is available to the base hydrogel polymer alone. Interpenetrating networks of polymer chains comprised of primary polymer(s) and strengthening polymer(s) are thereby formed. The primary polymer affords capillary-based water sorption properties while the strengthening polymer imparts significantly enhanced mechanical strength and elasticity to the hydrogel or superporous hydrogel.

Whilst the mechanical properties of these hydrogels are enhanced by that structure, no discussion is provided on the suitability of such reinforced hydrogel materials forward osmosis, and more particularly as a draw agent for forward osmosis. Moreover, the composite structure and composition of such materials differs significantly to the present invention as the strengthening structure is formed insitu of the hydrogel, rather than the hydrogel being formed within the 3D structure of a polymer foam.

The polymer hydrogel responsible for its water-swelling properties can have any suitable composition. The polymer hydrogel preferably comprises at least one ethylenically-unsaturated monomer polymerised with at least one multi-olefinic crosslinking agent.

An ethylenically-unsaturated monomer of the present invention is capable of being polymerized, e.g., by radical polymerization, with one or more monomers, crosslinkers, and the like. Exemplary of such monomers are water-soluble or water miscible monomers, such as (meth)acrylic acid, salts of (meth)acrylic acid, esters of (meth)acrylic acid and their derivatives {e.g., 2-hydroxyethyl (meth)acrylate, hydroxypropyl (meth)acrylate, butanediol monoacrylate}, itaconic acid, salts and acids of esters of (meth)acrylic acid, amides of (meth)acrylic acid, N-alkyl amides of (meth)acrylic acid, salts and acids of N-alkyl amides of (meth)acrylic acid, N-vinyl pyrrolidone, (meth)acrylamide, (meth)acrylamide derivatives (e.g., N-isopropyl acrylamide (NIPAM), N-cyclopropyl meth(acrylamide)), diallyldimethylammonium chloride (DADMAC), {2-(methacryloyloxy)ethyl} trimethylammonium chloride, N,N-dimethylaminoethyl acrylate, 2-acrylamido-2-methyl-1-propanesulfonic acid, potassium salt of 3-sulfopropyl acrylate (SPAK), 2-(acryloyloxy)ethyl trimethyl ammonium methyl sulfate, and the like. Particularly preferred monomers include acrylamide (AAm), NIPAM, 2-hydroxyethyl (meth)acrylate (HEA, HEMA), acrylic acid (AAc), inorganic and organic salts (e.g., potassium, sodium and ammonium) of AAc, DADMAC, SPAK, and mixtures of these. Other monomers can of course be used, the identification and formulation of which is well within the skill of the practitioner.

A multi-olefinic crosslinking agent of the present invention permits chemical crosslinking of polymer chains generated during polymerization. Typically, the crosslinking agent is a monomer or polymer containing at least two vinyl groups. Preferred crosslinking agents include N,N'-methylenebisacrylamide (BIS), N,N'-ethylenebisacrylamide (EBA), (poly)ethylene glycol di(meth)acrylate, ethylene glycol diglycidyl ether, glycidyl methacrylate, polyamidoamine epichlorohydrin resin, trimethylolpropane triacrylate (TMPTA), piperazine diacrylamide, glutaraldehyde, epichlorohydrin, as well as degradable crosslinkers including those having 1,2-diol structures (e.g., N,N'-diallyltartardiamide), and functionalized peptides and proteins (e.g., albumin modified with vinyl groups).

Polymerization can be initiated by any known applicable mechanism, including photochemical (e.g. using a UV lamp), thermal (e.g. using ammonium persulfate (APS)) and oxidation-reduction reactions (e.g. using APS/sodium metabisulfite (SMBS) or APS/tetramethyl ethylene diamine (TMEDA). Suitable polymerization conditions as referred to herein include ambient pressure and a temperature in the range of 5 to 90° C.; more preferably ambient temperature of 20 to 50° C. and most preferably 25 to 30° C. The time allowed for successful polymerization and foaming is conveniently in the range of a few seconds to 1 hr, more preferably 30 sec to 5 min and most preferably 2 to 4 min.

The concentration of monomers can influence the final hydrogel content of the composite. In some embodiments, the concentration of monomers is from 12.6 to 20 wt % in solution. The content of the hydrogel within the foam element influences the water draw flux of the final hydrogel composite draw material. The content of hydrogel in the composite is preferably from 50 to 95 wt %. However, in embodiments the hydrogel content can be from 60 to 90 wt %, preferably between 70 to 90 wt %. In some embodiments, the content of hydrogel in the composite is from 50 to 89 wt %, which, in use, produces a hydrogel composite draw material draws a water flux from 3.9 to 17.9 $L/m^2h$.

Finally, the hydrogel-foam composite of the present invention can be easily shaped depending on applications by tailoring the shape of the polymer foam element, the hydrogel composite draw material can be easily shaped. The swelled foam/hydrogel element can be handling easily during the applications and tailored by scissor without destroying their monolith-like shape. Moreover, the shape can be tuned by tailoring the foam element structure.

EXAMPLES

Exemplary embodiments of the hydrogel composite draw material of the present invention will now be exemplified in the following examples. It should be appreciated that these examples broadly demonstrate the materials and processes for forming such a hydrogel composite draw material. However, the examples should be understood to be applicable to a wide range of materials and compositions and should not be limited to the exemplified compositions and materials.

Chemicals and Materials

Sodium acrylate (SA, 99%), N,N'-methylenebisacrylamide (MBA, 99%), N-isopropylacrylamide (NIPAM, 96%) and ammonium persulfate (98%) were purchased from Sigma-Aldrich Australia. Forward osmosis (FO) membranes made from cellulose triacetate with an embedded polyester screen mesh were provided by Hydration Technologies Inc. (Albany, Oreg.).

Preparation of Hydrogel Draw Agent

The poly(N-isopropylacrylamide)-co-poly(sodium acrylate) (PNIPAM-PSA) hydrogel powders were prepared via radical polymerization by using NIPAM and SA as monomers, MBA as cross-linker, and ammonium persulfate (APS) as initiator. Typically, 3.33 g of SA and 1.67 g of NIPAM were dissolved in 25 ml of deionized water at room temperature. Then, 0.12 g of MBA and 0.08 g of APS were added into the above solution. After complete dissolution, the polymerization was carried out at 90° C. for 2 h. To remove the unreacted monomers and low-molecular-weight polymer, the hydrogels were cut into small pieces and immersed into deionized water at room temperature for 3 days. The hydrogel was then dried at 80° C. in an oven and then the powder form was obtained by grinding dried hydrogel.

To prepare a PNIPAM-PSA-PU composited hydrogel, the polyurethane foam (PUF) with tailored size was fully soaked in the clear solution of monomers, cross-linker and initiator. The PUF was squeezed by using spatulas to exclude the air in the foam. The saturated PUF and residual precursor were heated to 90° C. for polymerization. The hydrogel outside of PUF was carefully scraped before soaking in EtOH and water mixture (v/v, 1:1) to remove the unreacted monomers and low-molecular-weight polymer. The PNIPAM-PSA-PU composited hydrogel was obtained after dried at 80° C. in an oven. The mass ratio of PUF and hydrogel was calculated by the mass of PUF before and after loading hydrogel. The mass ratio of gel respect to PUF (from 1:1 to 8:1) was adjusted by changing the concentration of monomers from 12.6 to 20 wt %.

Characterization

Scanning electronic microscopy (SEM) image of PUF and PNIPAM-PSA-PU composited hydrogel was determined by field-emission scanning electronic microscopy (FEI Nova NanoSEM 450). The sample was sputter-coated with platinum before test.

FO measurements were carried out in a home-made setup as our previous report (see reference 27). The dried hydrogel monoliths with size of about 0.5×0.5×1 cm as a draw agent were placed on the active side of the FO membrane with an effective area of 4.90 cm², while DDI water or NaCl solution with different concentrations (0.2-3.5 wt %) was used as the feed solution on the other side of the FO membrane. The FO membrane was immersed in the DDI water for at least 12 h before use. Water flux, F (L m$^{-2}$ h$^{-1}$, or LMH), was calculated by:

$$F = \frac{V}{At} \quad (1)$$

where V (L) is the volume of water absorbed by the hydrogel, calculated by dividing the mass of the water (i.e., the mass increase of the hydrogel measured by a KERN ASL256-4A balance, Germany, accuracy: 0.1 mg) by its density, t (h) is the time and A (m²) is the effective area of the FO membrane (4.90 cm²).

The swelling experiment was carried out by soaking the monolith with the same size (about 1×1×1.5 cm) in 500 ml of DI water. The mass of sample was recorded at intervals after carefully wiping the water adsorbed on the surface of monolith with tissue. To visually investigate the water transport inside the gel/PUF, copper nitrate solution was used. Typically, 0.6 g of Cu(NO$_3$)$_2$.3H$_2$O was dissolved in 50 mL of water. Then the solution was poured in a petri dish to get a solution with around 3 mm depth. The gel/PUF monolith stood in the solution to contact with the solution adequately. The colour of gel/PUF monolith was recorded via photos.

In the solar dewatering process, 0.76 g of the swollen polymer hydrogel (dry powder with 10 times its mass of water) was placed under the sunlight simulator (2 kW m²). The water recovery rate (R) was calculated by $$R = \frac{W_1}{W_0} \times 100\% \quad (2)$$

where $W_1$ is the weight of the water lost during the solar dewatering and $W_0$ is the weight of the water contained in the swollen hydrogel before the dewatering test.

Results and Discussion

PU is one of most commonly used polymer foam and it shows high porosity, open framework, and high flexibility. PUF was fully soaked in the precursors of hydrogel to let the monomers enter the macropores of PUF and polymerize in the PUF (FIG. 1B, Step 1). The polymer hydrogel, poly(N-isopropylacrylamide)-co-poly(sodium acrylate) (PNIPAM-co-PSA), was chosen as a typical draw agent. The segment of PNIPAM is thermal responsive, which is benefit to the dewatering process when the temperature increases to 32° C. The ionic polymer (PSA) with high osmosis pressure can effectively increase the flux of FO process. After washing and drying to remove the unreacted monomers and water (FIG. 1B, Step 2), a gel/PUF composite was obtained.

Figure 2:
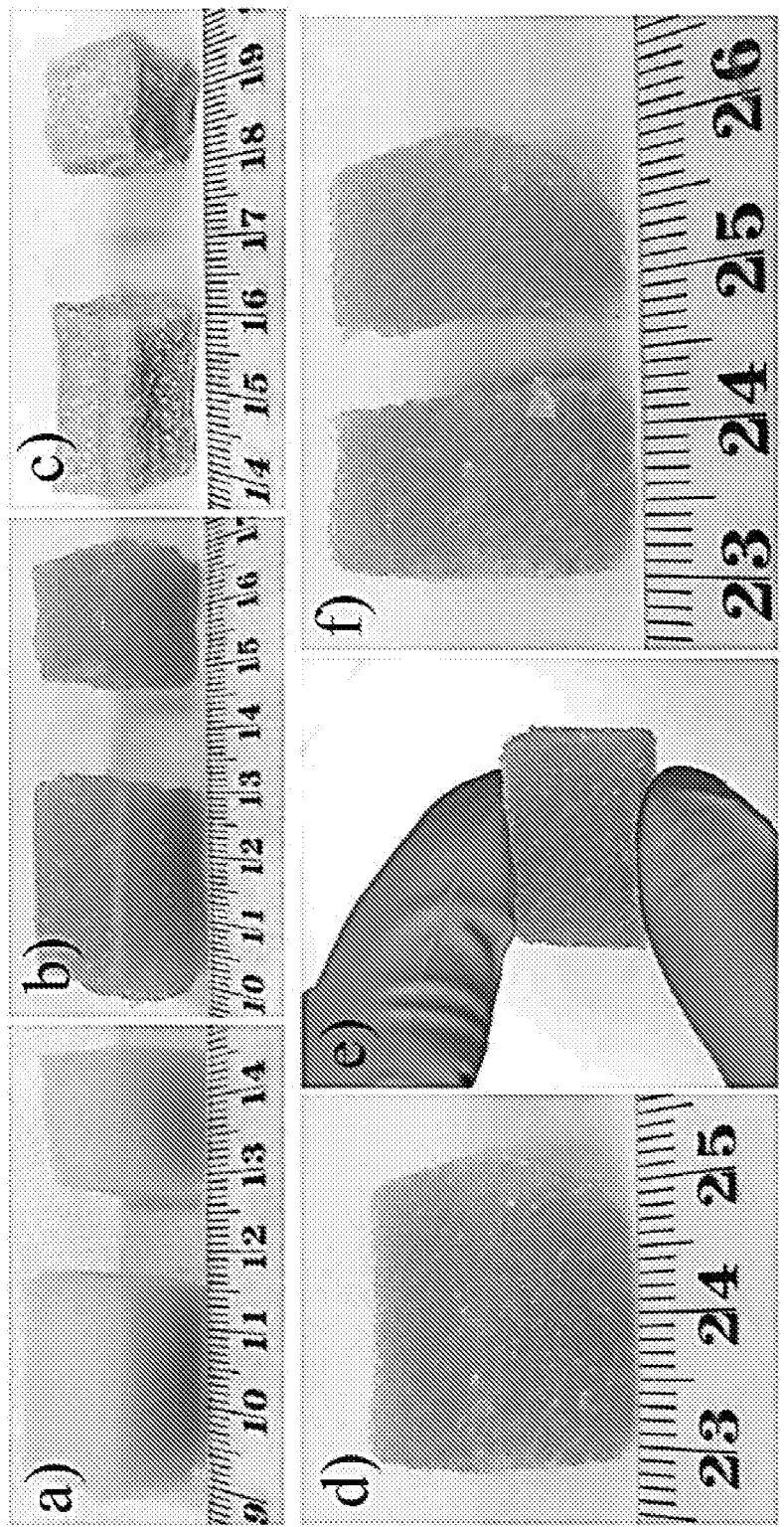
FIG. 2 provides digital photographs of a) polyurethane foam (PUF), b) after loading with PSA-PNIPAM hydrogel, c) dry gel/PUF composites, d) PUF/PSA-PNIPAM hydrogel before cut, e) PUF/PSA-PNIPAM hydrogel handled with finger, and f) PUF/PSA-PNIPAM hydrogel after cutting with scissor.

As the commercial polyurethane foam (PUF) shows high flexibility, it can be easily tailored to any shape for different applications (FIG. 2a). After loading the precursors of hydrogel including monomers (SA, NIPAM), crosslinker (N, N'-methylenebisacrylamide; MBA) and initiator (ammonium persulphate; APS) in water followed by radical polymerization at 90° C., hydrogel/PUF composites with similar shape and size were obtained (FIG. 2b). After washing with ethanol and water to remove the unreacted monomers, the composites were fully dried in the oven. The obtained gel/PUF show similar shape with the PUF but an obvious shrinkage, especially for the six faces of cube, which caused by the removal of water (~80 wt %) in the hydrogel (FIG. 2c). Due to the uniform distributions of hydrogel in the matrix of PUF, the shape of hydrogel/PUF composites were well retained even after handling and tailoring (FIG. 2d-f), which indicating a robust mechanical property.

Figure 3:
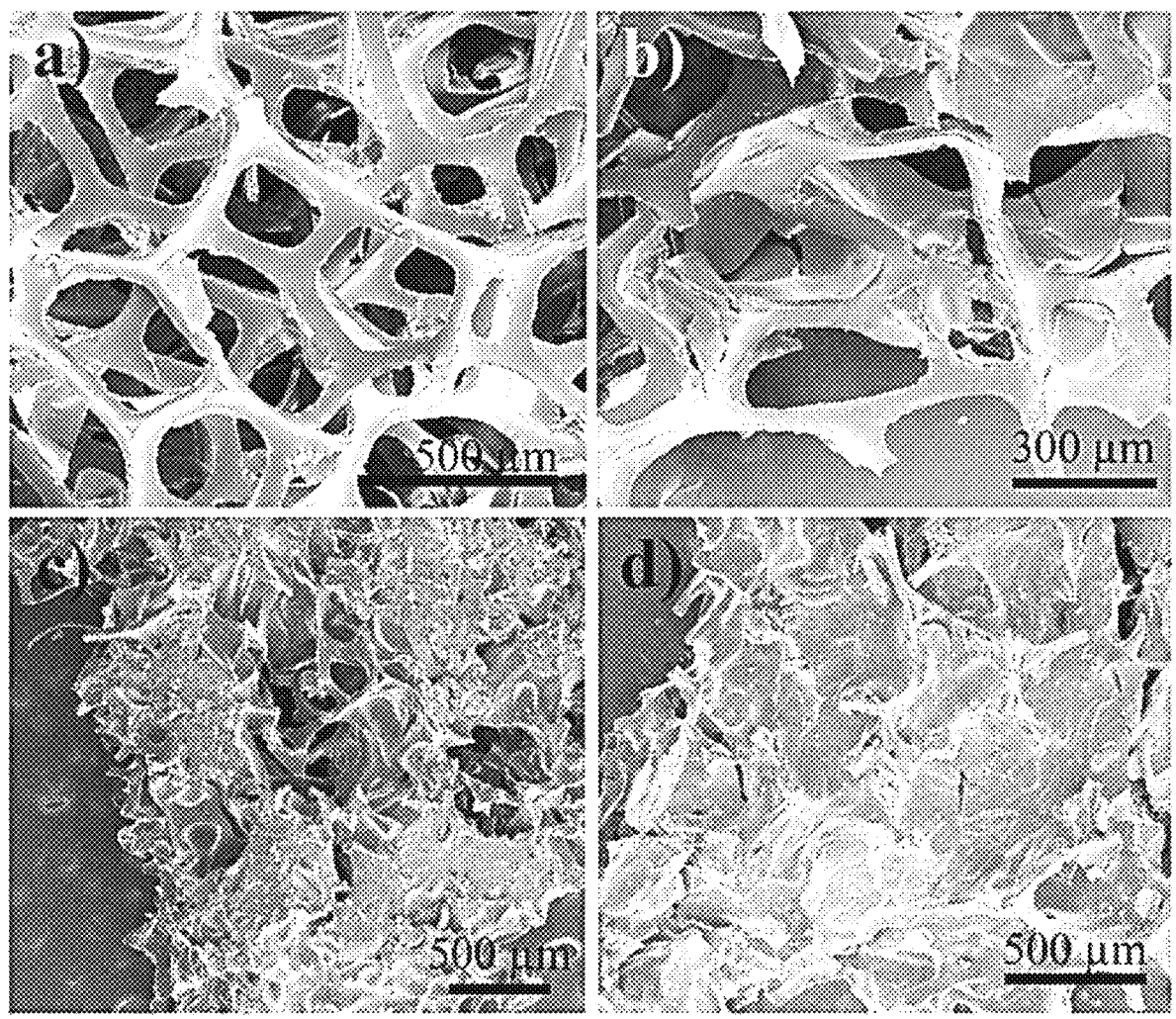
FIG. 3 provides scanning electron microscopy (SEM) images of a) PUF, b) Hydrogel/PUF-1:1, c) Hydrogel/PUF-3:1, and d) Hydrogel/PUF-8:1.

Scanning electron microscopy (SEM) image of PUF shows a 3-D continuous porous structure with pore size of about 400 μm (FIG. 3a). After loading the gel, SEM image of gel/PUF (mass ratio, 1:1) reveals that the gels are successfully loaded in the macropores of PUF (FIG. 3b). As the mass ratio of gel with respect to PUF further increases from 4:1 to 8:1, almost all the macropores are filled with gel (FIG. 3c-d), indicating the formation of the gel/polyurethane interpenetrating network (HPIPN). From the results of hydrogel/PUF (FIG. 2b), the hydrogels were distributed uniformly in the PU foam. After drying, the gels were still in the PUF, which reveals the homogenous shrinkage of both hydrogel and PUF. As is known, PUF is elastic like most of the common sponge. Due to a uniform distribution of hydrogel in PU foam, the shrinkage of hydrogel during drying process will drive the shrinkage of PUF together. This may be due to a strong hydrogen bonding between polyurethane and poly(N-isopropylacrylamide), which can effective avoid a phase separation of PUF and polymer hydrogel during the polymerization and drying process. The optical image also confirms that the overall homogeneous distributions in centimetre-scale after polymerization and drying process.

Figure 7:
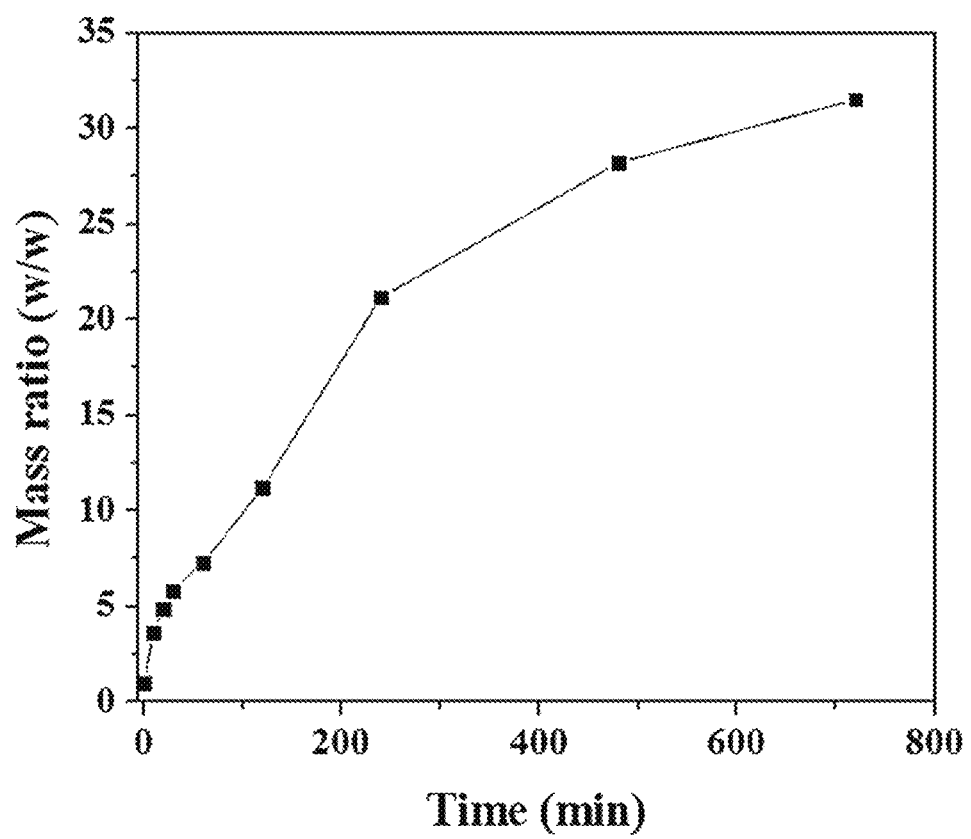
FIG. 7 shows a swelling kinetic for the hydrogel-polyurethane interpenetrating network (HPIN) in pure water.
Figure 8:
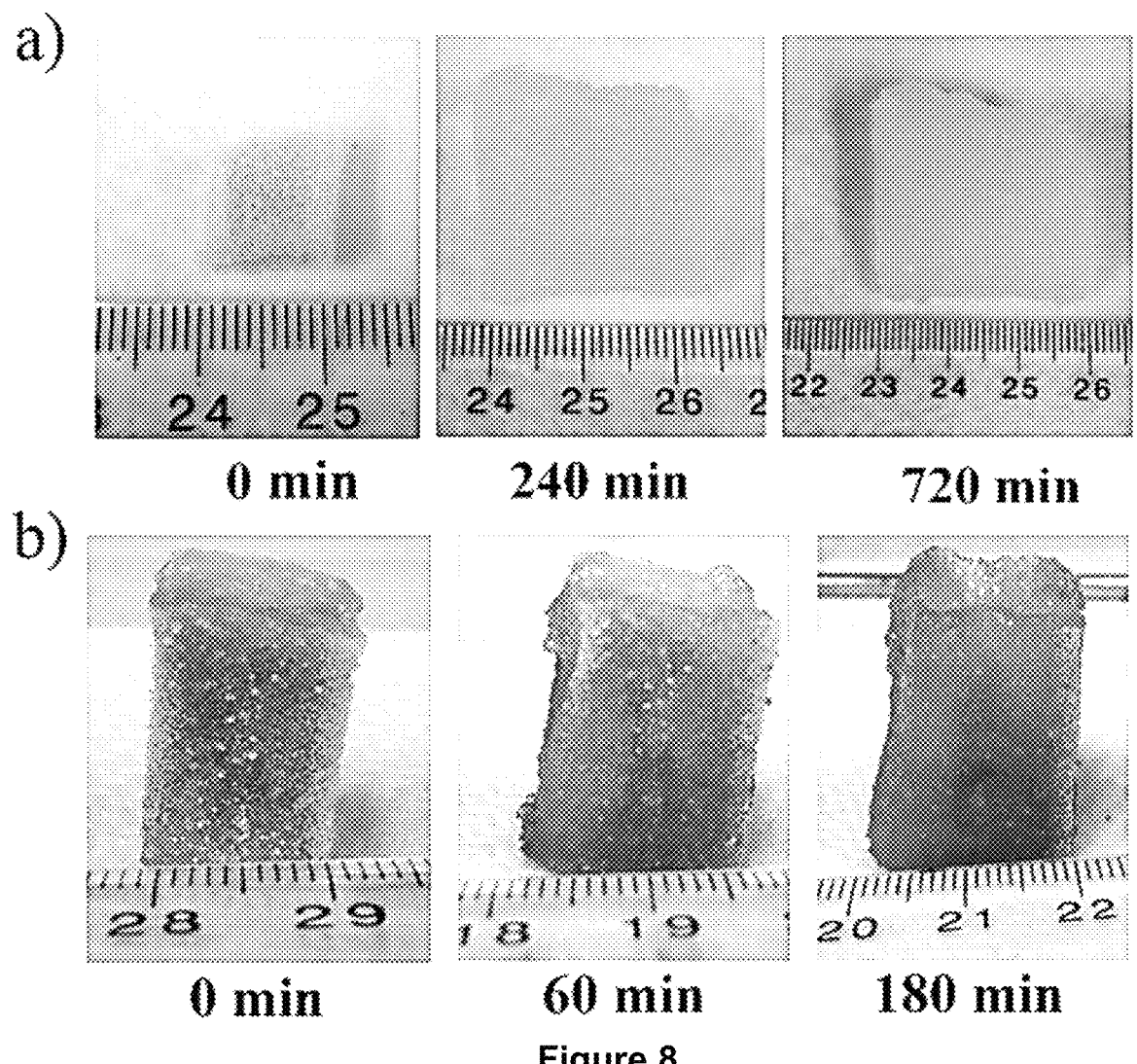
FIG. 8 shows a) Digital photographs of hydrogel/PUF composites with different soaking time (0, 240 and 720 min). b) gel/PUF stood in the copper nitrate solution for the test the water transport in the matrix.

To investigate the water adsorb kinetics of gel/PUF, the gel/PUF (mass ration, 8:1) was immersed in DDI water for adsorption of water. It can be seen the gel/PUF reveals a fast rate of water adsorption (FIG. 7). During the adsorption, the volume of the gel/PUF also increases as shown in FIG. 8a. From the optical image of the dry gel/PUF and swelling ones, the cuboid shape of the composites nearly keep constant except the volume. In the middle area of hydrogel/PUF bulk, the colour is yellow, which is similar to the dry one, indicating the water enters the matrix of composition from outside to inside gradually. It's important to investigate the water transport in the gel/PUF matrix. Therefore, one end of dry gel/PUF was put in the copper nitrate solution to let the solution transport form the bottom to the upper layer of gel/PUF (FIG. 8b). The optical images clearly show that water can transport easily from bottom to top of composites. From the colour differences, it can be concluded that water can transport easily from the surface of composites.

As the size of the bulk materials plays a key role during water transport inside of the hydrogel, gel/PUF composites with different ratios of gel to PUF and the similar size (i.e. 1×1×1.5 cm) were immersed in water to investigate the water absorption kinetics. As seen from FIG. 4a, the composites with high gel content show enhanced water absorption rate due to the high swelling ratio of hydrogel materials.

Figure 4:
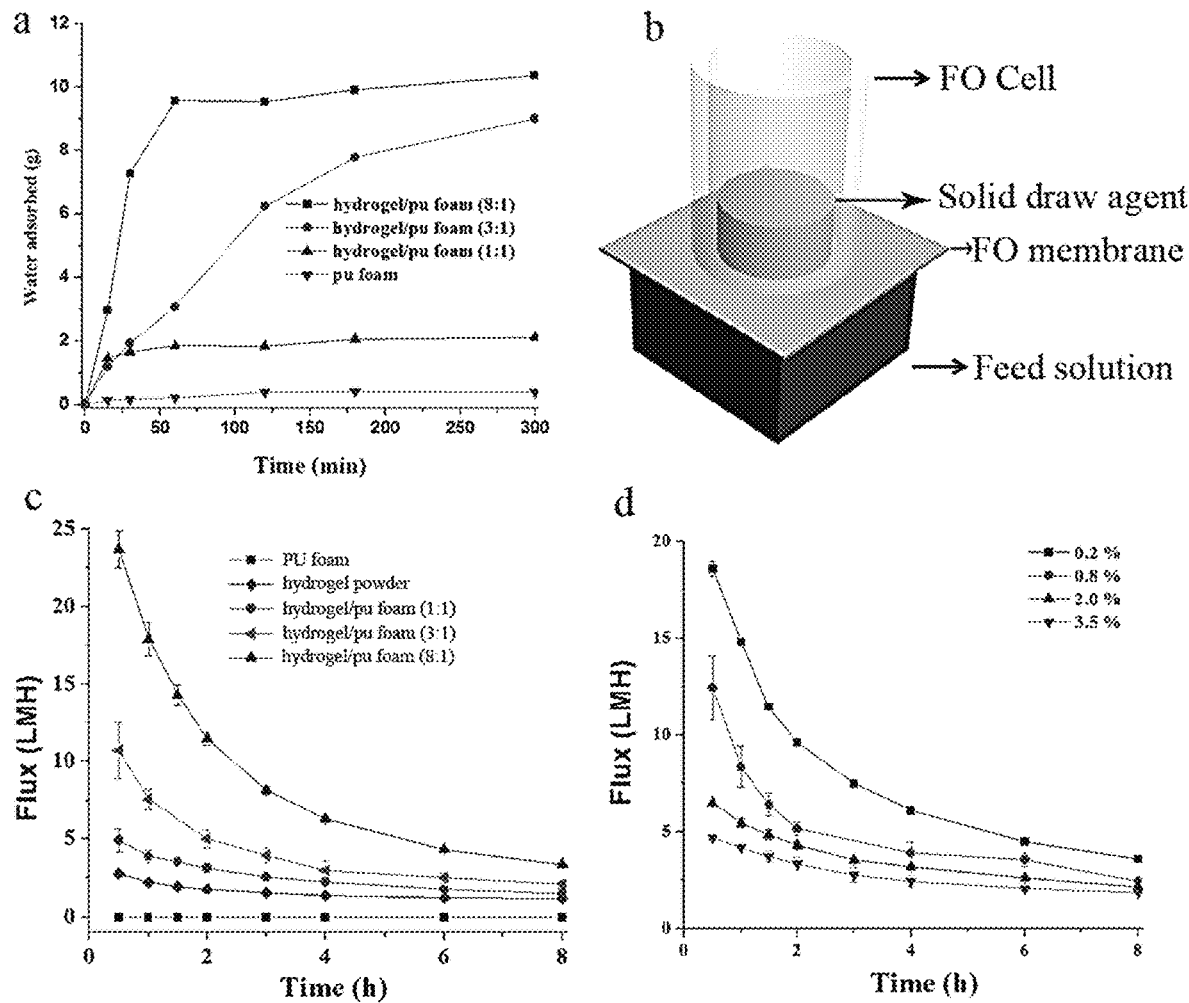
FIG. 4 illustrates a) a swelling experiment, which was carried out by soaking the monolith with the same size (about 1×1×1.5 cm) in 500 ml of DI water. b) The schematic for the Forward Osmosis (FO) desalination process by using hydrogel as a draw agent. c) The flux measured by using hydrogel/sponge composites with different mass ratios as draw agent, and water as feed solution. d) The flux measured by using hydrogel/sponge composites (mass ratio of 8:1) as draw agent, and NaCl solution with different concentrations (from 0.2 to 3.5 wt %) as feed solution.

The gel/PUF composites were further used as the draw agent due to their 3-D continuous structure and fast rate of water adsorption and transport. The setup for the test of FO process was shown in FIG. 4b. The solid draw agent (gel/PUF) was put on the active side of FO membrane. The support layer of FO membrane was facing the feed solution. The DDI water was firstly chosen as the feed solution. When pure PUF was used as the draw agent, no flux was observed owing to its weak capillary force. When hydrogel powder was used as the draw agent, the 1 h's flux is as low as 2.2 LHM, which is consistent to the previous reports (see reference 32). Because the water is difficult to transport from the bottom to the up layer of draw agent, the up layer of the hydrogel is dry after 8 h's FO process. Differently, when gel/PUF composites were used as the draw agent, the water can transport easily from the bottom to up layer of the draw agent. This is important to the draw agent, as all the draw agent can be effectively used during the FO process. When the mass ratio of gel respect to PUF increases from 1:1 to 8:1, the flux (1 hour) also increases from 3.9 to 17.9 LMH (FIG. 4c). When the gel was fully filled in the pores of PUF, the flux is highest, which is almost 8 times to the common used hydrogel powders without PUF. Due to its high flux, gel/PUF with mass ration of 8:1 was used as the draw agent and different concentrations of sodium chloride solution were used as the feed solution. As the concentrations of NaCl solution increases from 0.2 to 3.5 wt %, the one hour's flux decreases from 14.8 to 4.2 LMH, due to the higher osmotic pressure of feed solution with higher concentration of NaCl solution (FIG. 4d). The flux is better than all the previous reported hydrogel draw agents, see Table 1:

TABLE 1

Summary of the flux by using polymer hydrogels and their composites as the draw agents in the FO desalination

| Materials | 1 h's Flux (LMH) | Feed Solution | Reference |
| --- | --- | --- | --- |
| PSA | 0.96 | 0.2 wt % NaCl solution | 1 |
| PNIPAM | 0.27 | 0.2 wt % NaCl solution | 1 |
| PNIPAM-co-SA (size of 2-25 µm) | 1.0 | 0.2 wt % NaCl solution | 2 |
| PSA/Carbon | 1.06 | 0.2 wt % NaCl solution | 3 |
| PSA/rGO | 3.1 | 0.2 wt % NaCl solution | 4 |
| PSA-co-PNIPAM/rGO | 1.7 | 0.2 wt % NaCl solution | 4 |
| PSA-co-PNIPAM/γ-$Fe_2O_3$ | 1.4 | 0.2 wt % NaCl solution | 5 |
| PNIPAM-SA (semi-IPN) | 0.24 | 0.2 wt % NaCl solution | 6 |
| Microgel (PNIPAM) | 2 | 0.2 wt % NaCl solution | 7 |
| Microgel (PNIPAM-PAA) | 4 | 0.2 wt % NaCl solution | 7 |
| PSA-co-PNNIPAM-PUF | 14.8 | 0.2 wt % NaCl solution | This study |

Figure 5:
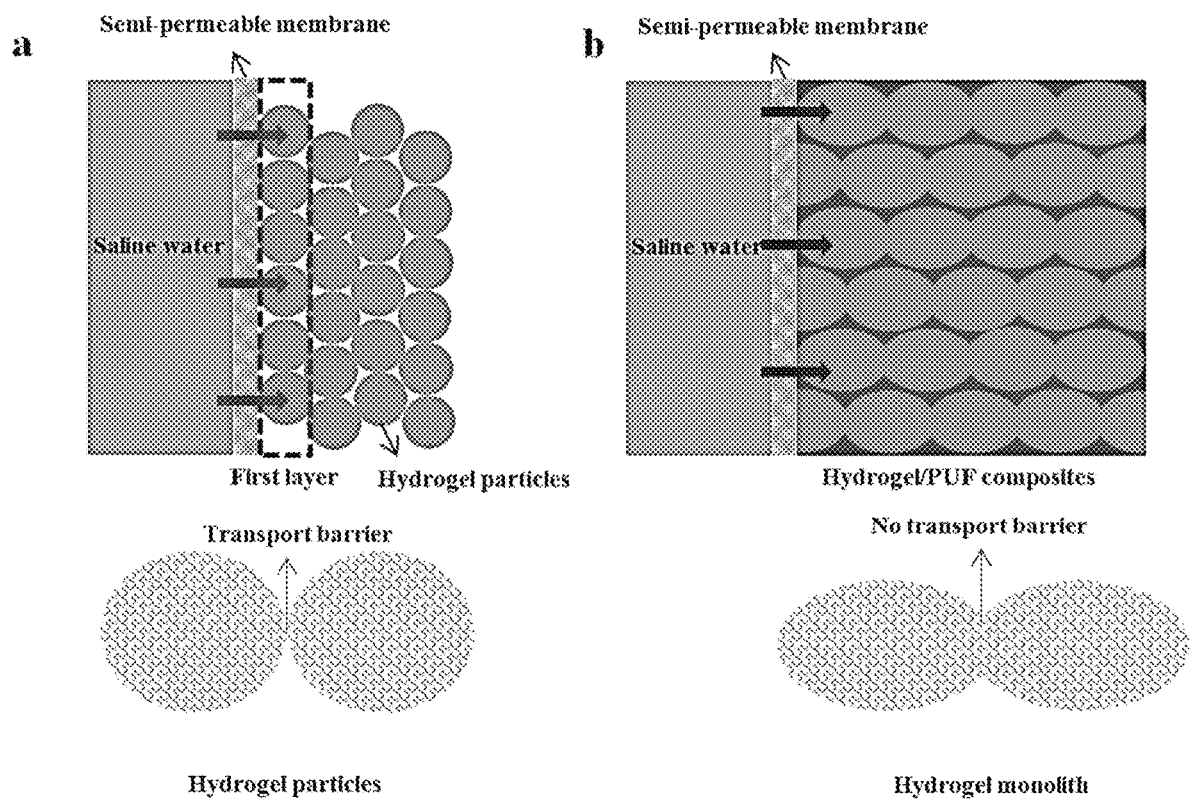
FIG. 5 illustrates water transport in the (a) hydrogel powder and (b) hydrogel/PUF composites according to the present invention.

Based on the above results, the high flux was ascribed to the unique hydrogel-polyurethane interpenetrating network with 3D continuous structure. During the FO process, the osmotic pressure of the draw agent is very important to the FO flux. When draw solution was used, the stirring can be used to eliminate the concentration gradient effectively. However, when "solid" hydrogel draw agent was used, the concentration gradient in the hydrogel is difficult to be eliminated as the water trapped in the hydrogel particles is difficult to transport easily between different hydrogel particles (FIG. 5a). As the result, only the hydrogel particles on the active surface of FO membrane can be effectively utilized. The up layer of the hydrogel powders was usually completely dry after FO process. In our case, the unique hydrogel-polyurethane interpenetrating network with 3D continuous structure can effective solve this problem as the water can transport inside of the hydrogel/PUF composites easily. As the hydrogel in the matrix of the hydrogel/PUF composites are continuous, the dry gel can easily pull the water from the bottom to up layer (FIG. 5b). In addition, we also think that there might be an interface between hydrogel and PUF surface, which can produce a strong capillary force and a transport pathway to speed the water transport inside of hydrogel/PUF compositions.

Figure 6:
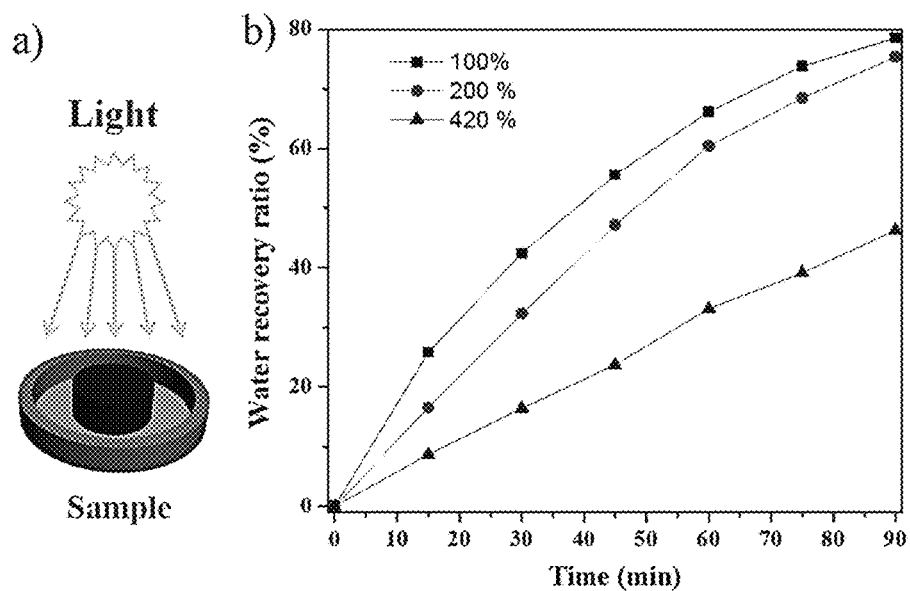
FIG. 6 provides (a) a schematic for the dewatering process of hydrogel/PUF composites; (b) Water recovery ratio of hydrogel/PUF composites with different swelling ratio (100, 200 and 420%).

In the dewatering process, the hydrogel/PUF composites with different swelling ratio (100, 200 and 420 wt %) were treated under the simulated sunlight with density of 2.0 kW $m^{-2}$ (FIG. 6a). It is noted that during the solar dewatering process, a portion of water may evaporate as vapour. After exposure to the simulated sunlight for 90 min, the water released from swollen hydrogel/PUF composites is around 79, 75, 46 wt % respectively for different swelling ratios. As the water content in the swelling hydrogel/PUF composites increases from 100 to 200%, the water recovery is similar; indicating that the water located in the matrix of hydrogel/PUF composites can be easily removed. When the swelling ratio increases to 420%, the high content of water makes the temperature of composites increases slower, resulting in a lower recovery rate.

CONCLUSION

In conclusion, a hydrogel-polyurethane interpenetrating network (HPIPN) with monolith form was prepared by controlling the polymerization of the monomers (N-isopropylacrylamide and sodium acrylate) in the macropores (~400 μm) of commercial polyurethane foam. By tailoring the shape of PUF, the HPIPN can be easily shaped. The content of hydrogel in the HPIPN can be adjusted from 50 to 89% by increasing the concentration of monomers from 12.6 to 20 wt %. The HPIPN was further used as draw agent for forward osmosis desalination, which shows high flux from 3.9 to 17.9 LMH as the content of hydrogel in the composites from 50 to 89 wt %. The 3D continues network, as well as elastic nature when adsorption/desorption of water are of benefit to the water transport from the contact layer of hydrogel to upper layer, which avoids the transport barrier existed in the powder form.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

REFERENCES

1. P. Patel-Predd, *Environmental Science & Technology*, 2006, 40, 3454-3455.
2. A. Subramani and J. G. Jacangelo, *Water Research*, 2015, 75, 164-187.
3. T. Y. Cath, A. E. Childress and M. Elimelech, *Journal of Membrane Science*, 2006, 281, 70-87.
4. J. R. McCutcheon, R. L. McGinnis and M. Elimelech, *Desalination*, 2005, 174, 1-11.
5. S. Gormly, J. Herron, M. Flynn, M. Hammoudeh and H. Shaw, *Desalination and Water Treatment*, 2011, 27, 327-333.
6. L. A. Hoover, W. A. Phillip, A. Tiraferri, N. Y. Yip and M. Elimelech, *Environmental Science & Technology*, 2011, 45, 9824-9830.
7. K. Lutchmiah, E. R. Cornelissen, D. J. H. Harmsen, J. W. Post, K. Lampi, H. Ramaekers, L. C. Rietveld and K. Roest, *Water Science and Technology*, 2011, 64, 1443-1449.
8. T.-S. Chung, S. Zhang, K. Y. Wang, J. Su and M. M. Ling, *Desalination*, 2012, 287, 78-81.
9. L. Chekli, S. Phuntsho, H. K. Shon, S. Vigneswaran, J. Kandasamy and A. Chanan, *Desalination and Water Treatment*, 2012, 43, 167-184.
10. Q. Ge, M. Ling and T.-S. Chung, *Journal of Membrane Science*, 2013, 442, 225-237.
11. D. Li and H. Wang, *Journal of Materials Chemistry A*, 2013, 1, 14049-14060.
12. A. Achilli, T. Y. Cath and A. E. Childress, *Journal of Membrane Science*, 2010, 364, 233-241.
13. M. M. Ling, K. Y. Wang and T.-S. Chung, *Industrial & Engineering Chemistry Research*, 2010, 49, 5869-5876.
14. Y. Xu, X. Peng, C. Y. Tang, Q. S. Fu and S. Nie, *Journal of Membrane Science*, 2010, 348, 298-309.
15. S. K. Yen, F. M. Haja N, M. Su, K. Y. Wang and T.-S. Chung, *Journal of Membrane Science*, 2010, 364, 242-252.
16. H. Bai, Z. Liu and D. D. Sun, *Separation and Purification Technology*, 2011, 81, 392-399.
17. Q. Ge, J. Su, T.-S. Chung and G. Amy, *Industrial & Engineering Chemistry Research*, 2011, 50, 382-388.
18. M. M. Ling, T.-S. Chung and X. Lu, *Chemical Communications*, 2011, 47, 10788-10790.
19. Q. Ge, J. Su, G. L. Amy and T.-S. Chung, *Water Research*, 2012, 46, 1318-1326.
20. S. Sarp, S. Lee, K. Park, M. Park, J. H. Kim and J. Cho, *Desalination and Water Treatment*, 2012, 43, 131-137.
21. R. Alnaizy, A. Aidan and M. Qasim, *Desalination and Water Treatment*, 2013, 51, 5516-5525.
22. Y. Cai, W. Shen, S. L. Loo, W. B. Krantz, R. Wang, A. G. Fane and X. Hu, *Water Research*, 2013, 47, 3773-3781.
23. Y. Cai, W. Shen, R. Wang, W. B. Krantz, A. G. Faneb and X. Hu, *Chemical Communications*, 2013, 49, 8377-8379.
24. Q. Ge and T.-S. Chung, *Chemical Communications*, 2013, 49, 8471-8473.
25. D. Li, X. Zhang, J. Yao, G. P. Simon and H. Wang, *Chemical Communications*, 2011, 47, 1710-1712.
26. D. Li, X. Zhang, J. Yao, Y. Zeng, G. P. Simon and H. Wang, *Soft Matter*, 2011, 7, 10048-10056.
27. D. Li, X. Zhang, G. P. Simon and H. Wang, *Water Research*, 2013, 47, 209-215.
28. R. Ou, Y. Wang, H. Wang and T. Xu, *Desalination*, 2013, 318, 48-55.
29. A. Razmjou, M. R. Barati, G. P. Simon, K. Suzuki and H. Wang, *Environmental Science & Technology*, 2013, 47, 6297-6305.
30. A. Razmjou, Q. Liu, G. P. Simon and H. Wang, *Environmental Science & Technology*, 2013, 47, 13160-13166.
31. A. Razmjou, G. P. Simon and H. Wang, *Chemical Engineering Journal*, 2013, 215, 913-920.
32. Y. Zeng, L. Qiu, K. Wang, J. Yao, D. Li, G. P. Simon, R. Wang and H. Wang, *Rsc Advances*, 2013, 3, 887-894.
33. H. Wang, J. Wei and G. P. Simon, *Environmental science & technology*, 2014, 48, 4214-4215.
34. Y. Hartanto, S. Yun, B. Jin and S. Dai, *Water Research*, 2015, 70, 385-393.
35. K. Liu, T. C. Ovaert and J. J. Mason, *Journal of Materials Science-Materials in Medicine*, 2008, 19, 1815-1821.
36. N. Teramoto, O. Shigehiro, Y. Ogawa, Y. Maruyama, T. Shimasaki and M. Shibata, *Polymer Journal*, 2014, 46, 592-597.

The invention claimed is:

1. A hydrogel composite draw material for forward osmosis comprising:
    a porous elastic polymeric foam element including a three-dimensional continuous network of pores interpenetrated with a polymer hydrogel, the polymer hydrogel comprises an ionic polymer hydrogel with thermal responsive units, and the polymer hydrogel in the hydrogel composite draw material is from 50 to 95 wt %;
    wherein, in use, the hydrogel composite draw material draws a water flux of at least 3.5 L/m²h;
    wherein the water flux is measured by: dried hydrogel composite draw material monoliths with size of about 0.5×0.5×1 cm as a draw agent being placed on the active side of a forward osmosis membrane with an effective area of 4.90 cm², while a 2000 ppm NaCl aqueous solution being used as a feed solution on the other side of the forward osmosis membrane, the forward osmosis membrane being immersed in DDI water for at least 12 h before use, and wherein water flux, F (L m$^{-2}$h$^{-1}$, or LMH) is calculated by:

$$F = \frac{V}{At} \quad (1)$$

where V (L) is the volume of water absorbed by the hydrogel, calculated by dividing the mass of the water by its density, t (h) is the time and A (m$^2$) is the effective area of the forward osmosis membrane (4.90 cm$^2$).

2. The hydrogel composite draw material according to claim 1 comprising a draw material in forward osmosis desalination.

3. The hydrogel composite draw material according to claim 1, wherein, in use, the hydrogel composite draw material draws a water flux of at least 3.9 L/m$^2$h.

4. The hydrogel composite draw material according to claim 1, wherein the polymer hydrogel in the hydrogel composite draw material is from 50 to 90 wt %.

5. The hydrogel composite draw material according to claim 1, wherein the polymer hydrogel comprises poly(N-isopropylacrylamide)-co-poly(sodium acrylate).

6. The hydrogel composite draw material according to claim 1, wherein the hydrogel comprises a polymer or a co-polymer of at least one of: (meth)acrylic acid, salts of (meth)acrylic acid, esters of (meth)acrylic acid and hydroxyl derivatives thereof, itaconic acid, salts and acids of esters of (meth)acrylic acid, amides of (meth)acrylic acid, N-alkyl amides of (meth)acrylic acid, salts and acids of N-alkyl amides of (meth)acrylic acid, N-vinyl pyrrolidone, (meth)acrylamide, N-alkyl derivatives of (meth)acrylamide, alkyl ammonium salts, N-alkyl derivatives of an alkyl (meth)acrylate, 2-acrylamido-2-methyl-1-propanesulfonic acid, potassium salt of 3-sulfopropyl acrylate, 2-(acryloyloxy) ethyl trimethyl ammonium methyl sulfate, acrylamide (AAm), N-isopropyl acrylamide (NIP AM), 2-hydroxyethyl (meth)acrylate (HEA, HEMA), acrylic acid (AAc), salts of acrylic acid (potassium, sodium and ammonium), potassium salt of 3-sulfopropyl acrylate (SPAK), poly(ethylene glycol) acrylate, poly(ethylene glycol)alkyl ether acrylate, methacrylic acid-2-dimethylaminoethyl ester, dimethylaminoethyl acrylate or diallyldimethylammonium chloride (DADMAC).

7. The hydrogel composite draw material according to claim 1, wherein the polymer hydrogel comprises at least one of poly(N-isopropylacrylamide), poly(sodium acrylate), poly(vinylsulfonic acid, sodium salt), polyvinyl alcohol, Poly(N-isopropylacrylamide)-co-poly(acrylic acid), Poly(N-isopropylacrylamide)-co-poly(acrylamide), Poly(N-isopropylacrylamide)-co-poly(vinyl alcohol), Poly(N-isopropylacrylamide)-co-poly(alginic acid) or a combination thereof.

8. The hydrogel composite draw material according to claim 1, wherein the porous elastic polymeric foam element comprises a polyurethane foam, polyester foam, melamine foam, graphene oxide foam, or poly(ether imide) foam.

9. The hydrogel composite draw material according to claim 1, wherein the porous elastic polymeric has a three-dimensional open pore structure.

10. The hydrogel composite draw material according to claim 9, wherein the open pore structure forms a three-dimensional continuous network of pores substantially throughout the foam.

11. The hydrogel composite draw material according to claim 1, wherein the pores of the foam are sized from 200 nm to 1 mm.

12. The hydrogel composite draw material according to claim 1, wherein the hydrogel composite draw material has a monolith form.

13. The hydrogel composite draw material according to claim 12, wherein the monolith form can be shaped by tailoring the configuration of the base polymer foam element.

14. A method of forming a forward osmosis draw material comprising:
   introducing at least one ethylenically-unsaturated monomer and a multi-olefinic crosslinking agent within at least a portion of the pores of a porous elastic polymeric foam element including a three-dimensional continuous network of pores;
   subjecting the admixture to polymerization conditions to form a hydrogel composite thereof within the pores of the foam element; and
   thereby forming a hydrogel composite draw material of claim 1 for forward osmosis which in use, draws a water flux of at least 3.5 L/m$^2$h.

15. The method according to claim 14, wherein said introducing step comprises interpenetrating the at least one ethylenically-unsaturated monomer and the multi-olefinic crosslinking agent within the pores of the porous elastic polymeric foam.

16. The method according to claim 14, wherein polymerization comprises radical polymerization of the monomers.

17. The method according to claim 14, further comprising the step of:
   tailoring the shape of the polymer foam element to provide a selected configuration prior to introduction of the admixture to the polymer foam.

18. The method according to claim 14, wherein the at least one ethylenically-unsaturated monomer and multi-olefinic crosslinking agent are introduced within at least a portion of the pores of the porous elastic polymeric foam element in a form of a solution, and the concentration of monomers is from 12.6 to 20 wt % in the solution.

19. The method according to claim 14, wherein the polymer hydrogel in the hydrogel composite draw material is from 50 to 89 wt %.

20. The method according to claim 14, wherein the at least one ethylenically-unsaturated monomer is selected from (meth)acrylic acid, salts of (meth)acrylic acid, esters of (meth)acrylic acid and hydroxyl derivatives thereof, itaconic acid, salts and acids of esters of (meth)acrylic acid, amides of (meth)acrylic acid, N-alkyl amides of (meth)acrylic acid, salts and acids of N-alkyl amides of (meth)acrylic acid, N-vinyl pyrrolidone, (meth)acrylamide, N-alkyl derivatives of (meth)acrylamide, alkyl ammonium salts, N-alkyl derivatives of an alkyl (meth)acrylate, 2-acrylamido-2-methyl-1-propanesulfonic acid, potassium salt of 3-sulfopropyl acrylate, and 2-(acryloyloxy)ethyl trimethyl ammonium methyl sulfate.

21. The method according to claim 14, wherein the ethylenically-unsaturated monomer is selected from at least one of acrylamide (AAm), N-isopropyl acrylamide (NIP AM), 2-hydroxyethyl (meth)acrylate (HEA, HEMA), acrylic acid (AAc), salts of acrylic acid (potassium, sodium and ammonium), potassium salt of 3-sulfopropyl acrylate (SPAK), poly(ethylene glycol)acrylate, poly(ethylene glycol)alkyl ether acrylate, methacrylic acid-2-dimethylaminoethyl ester, dimethylaminoethyl acrylate and diallyldimethylammonium chloride (DADMAC).

22. The method according to claim 14, wherein the crosslinking agent is selected from the group consisting of N,N'-methylenebisacrylamide (BIS), N,N'-ethylenebisacrylamide (EBA), (poly)ethylene glycol di(meth)acrylate, ethylene glycol dimethacrylate, ethylene glycol diglycidyl ether, glycidyl methacrylate, polyamidoamine epichlorohydrin resin, trimethylolpropane triacrylate (TMPTA), piperazine diacrylamide, glutaraldehyde, epichlorohydrin, cross-linkers containing 1,2-diol structures, and functionalized peptides and proteins.

23. The method according to claim 14, further comprising the step of:
adding an initiator to initiate polymerisation of the hydrogel,
wherein the initiator is selected from the group consisting of 2,2'-azobisisobutyronitrile, 2,2'-azobis(2-methylpropionamidine) dihydrochloride, and ammonium persulfate.

24. The hydrogel composite draw material formed from the method according to claim 19.

25. A method of using the hydrogel composite draw material of claim 1, wherein the porous elastic polymeric foam element including a three-dimensional continuous network of pores interpenetrated with a polymer hydrogel for a draw material in forward osmosis desalination with a semi-permeable membrane, said method comprising:
locating the hydrogel composite draw material on the active side of the semipermeable membrane of a forward osmosis apparatus; and
flowing a feed saline solution across the opposite side of the semipermeable membrane, thereby allowing pure water to pass through the semipermeable membrane and be absorbed by the hydrogel composite draw material.

* * * * *